United States Patent [19]
Pierce, Jr. et al.

[11] 3,714,836
[45] Feb. 6, 1973

[54] AUTOMATIC TRANSMISSION CONTROLS FOR AN AUTOMOTIVE VEHICLE DRIVELINE

[75] Inventors: Stanley L. Pierce, Jr., Birmingham; William C. Winn, Inkster, both of Mich.

[73] Assignee: Ford Motor Company, Dearborn, Mich.

[22] Filed: Feb. 16, 1971

[21] Appl. No.: 115,454

[52] U.S. Cl.....................74/752 C, 74/864, 74/869
[51] Int. Cl............................F16h 3/74, B60k 21/00
[58] Field of Search.74/752 A, 752 B, 752 C, 752 D, 74/863, 864, 867, 868, 869

[56] References Cited

UNITED STATES PATENTS

| | | |
|---|---|---|
| 3,258,984 | 7/1966 | Searles....................................74/864 |
| 3,321,056 | 5/1967 | Winchell et al....................74/869 X |
| 3,038,353 | 6/1962 | Roche..............................74/863 X |

*Primary Examiner*—Arthur T. McKeon
*Attorney*—John R. Faulkner and Donald J. Harrington

[57] ABSTRACT

An automatic control valve circuit for controlling the application and release of fluid pressure operated servos in an automatic power transmission mechanism for an automotive vehicle driveline including pressure booster valve means for augmenting the servo pressure during coast braking of the vehicle at high speeds and limiting that pressure to a predetermined maximum value, and valve means for cushioning the application of a reaction brake during a ratio change to an underdrive condition whereby harshness in the ratio shifts to the underdrive ratio is reduced and excessive load on the hydraulic pump for the circuit is avoided.

14 Claims, 6 Drawing Figures

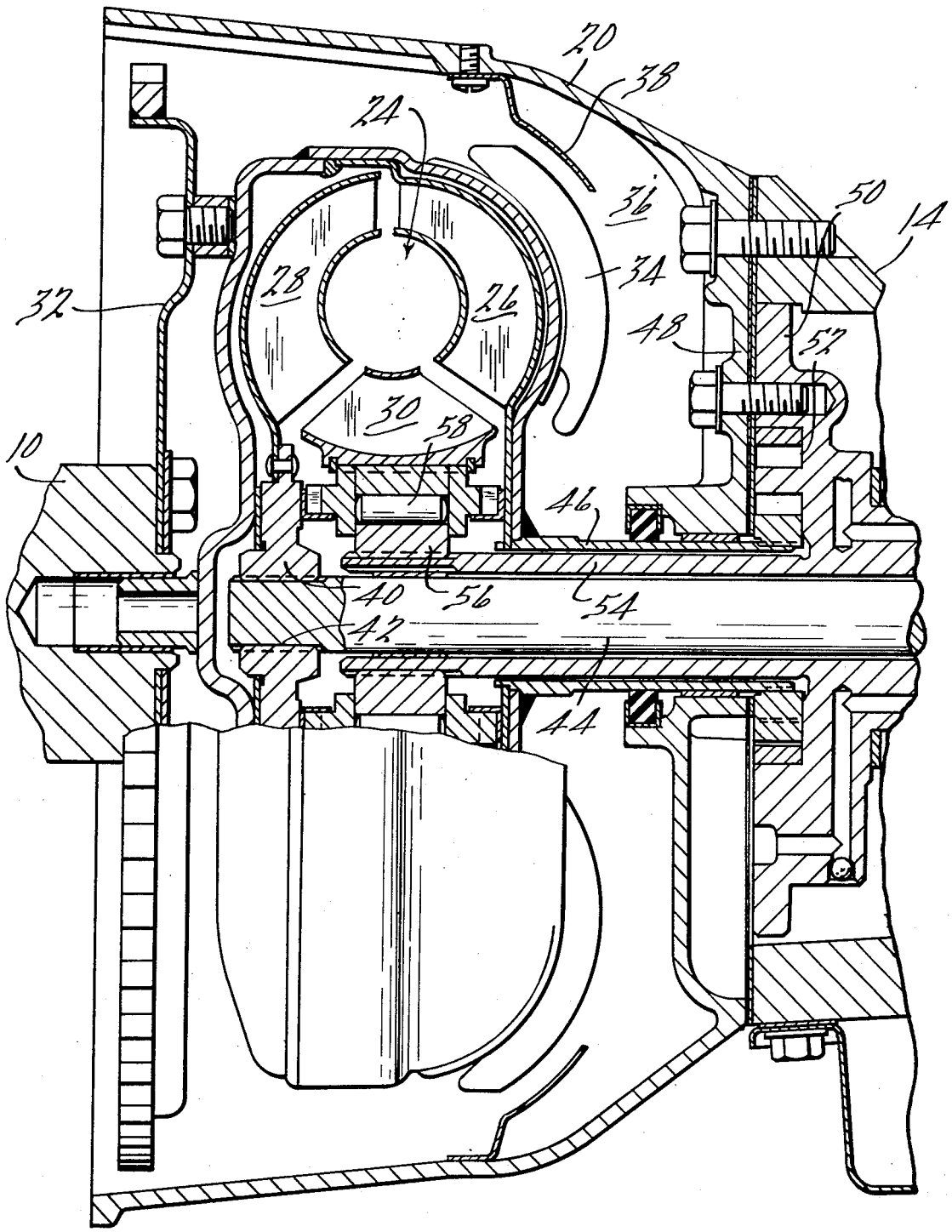

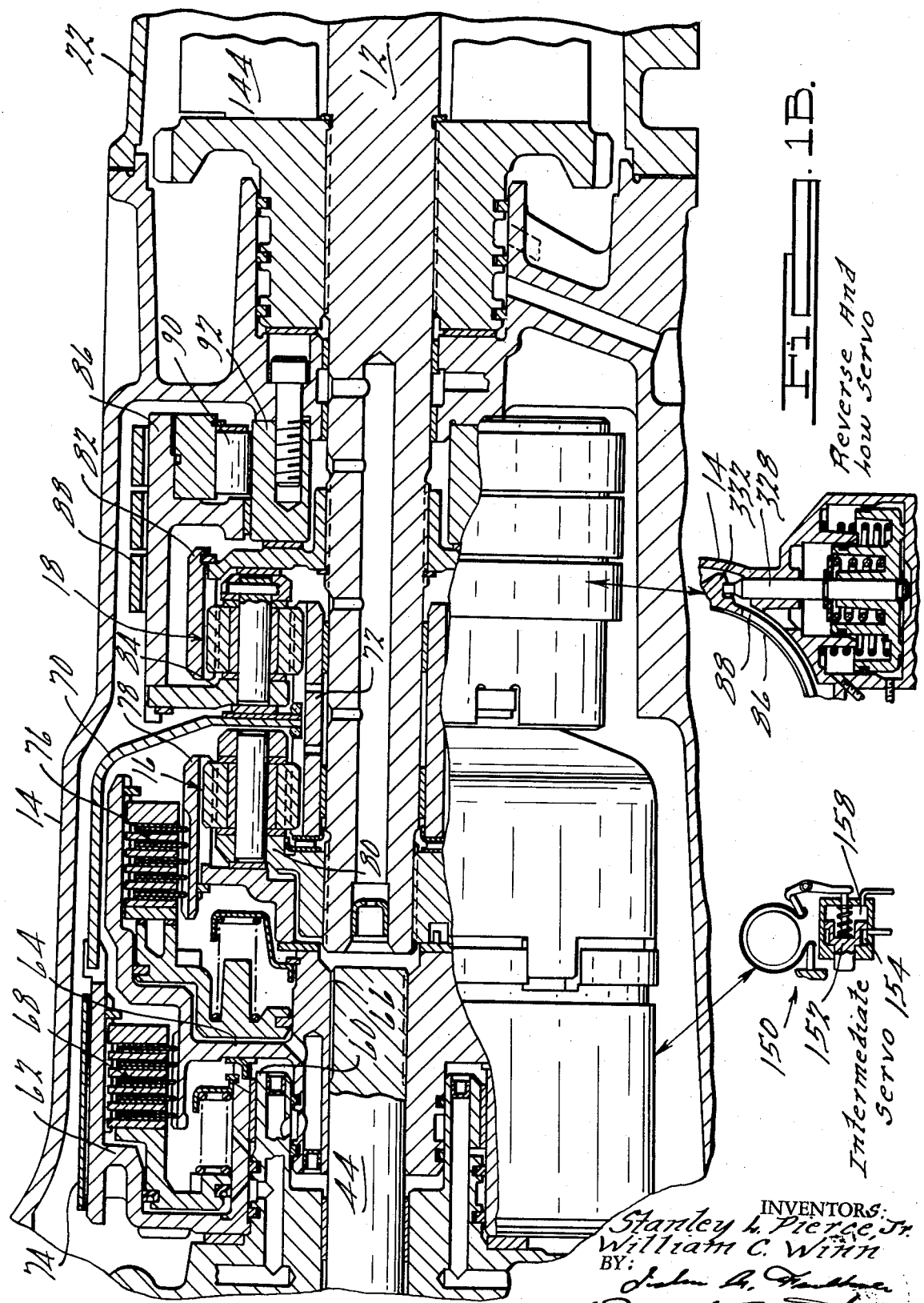

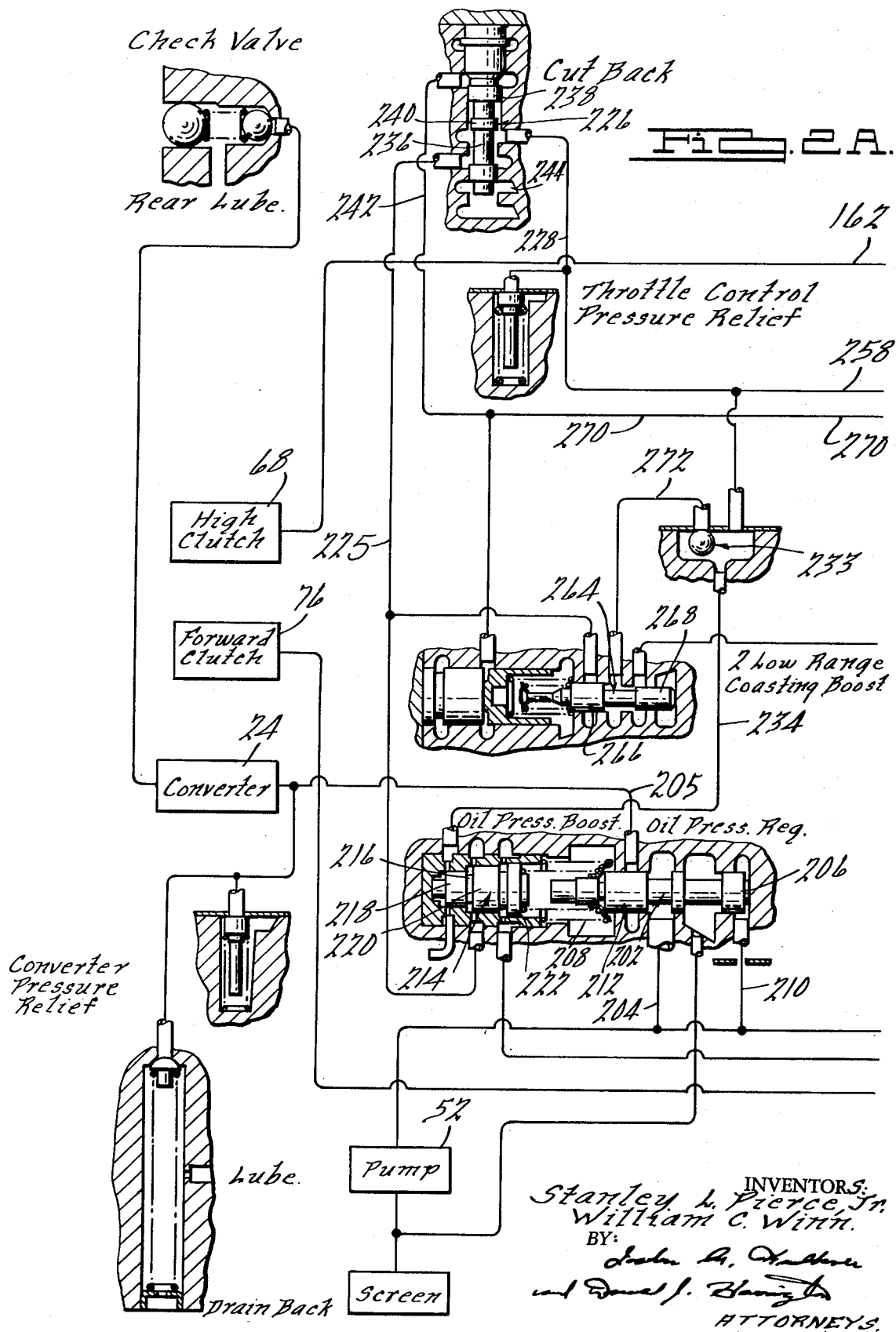

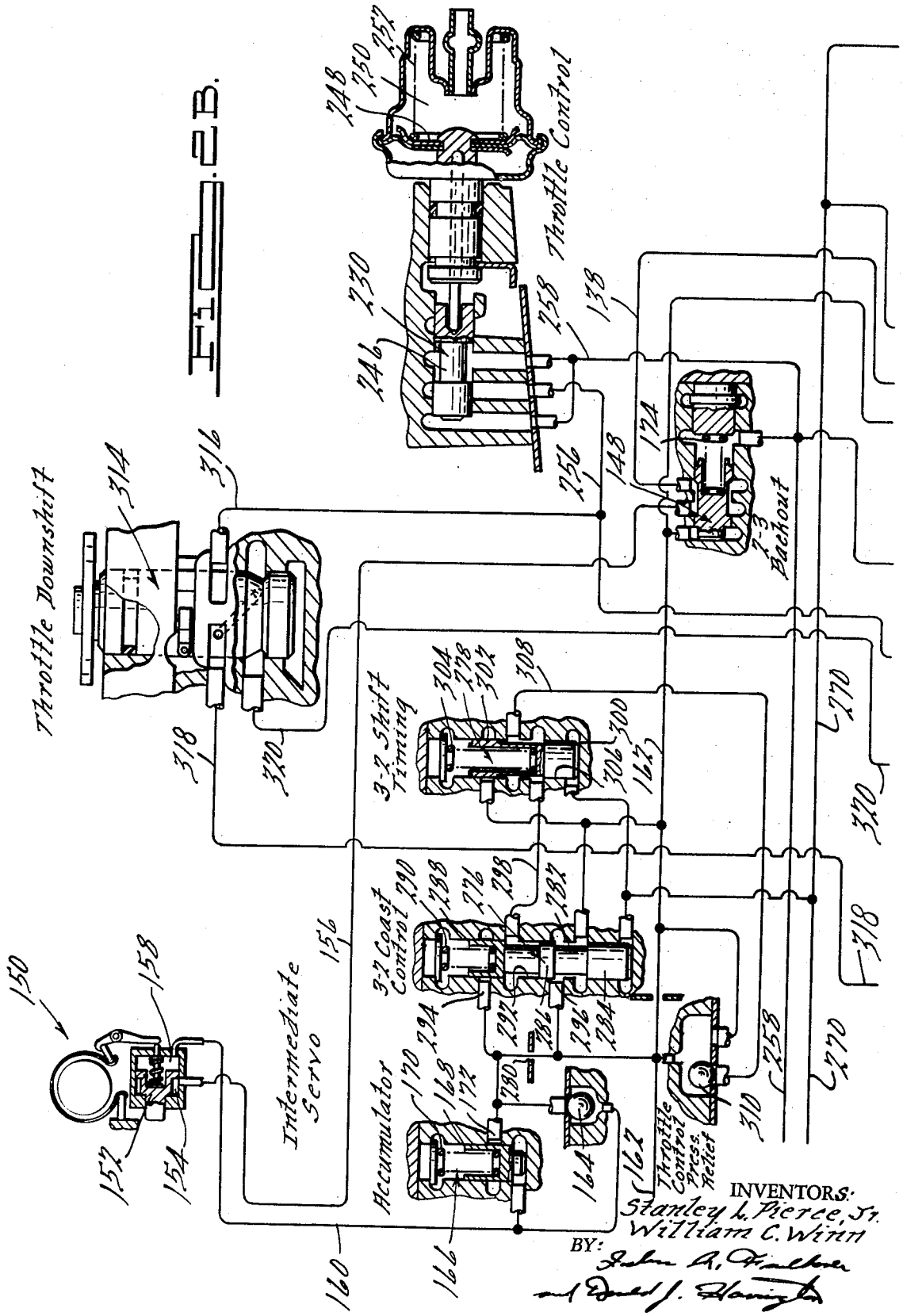

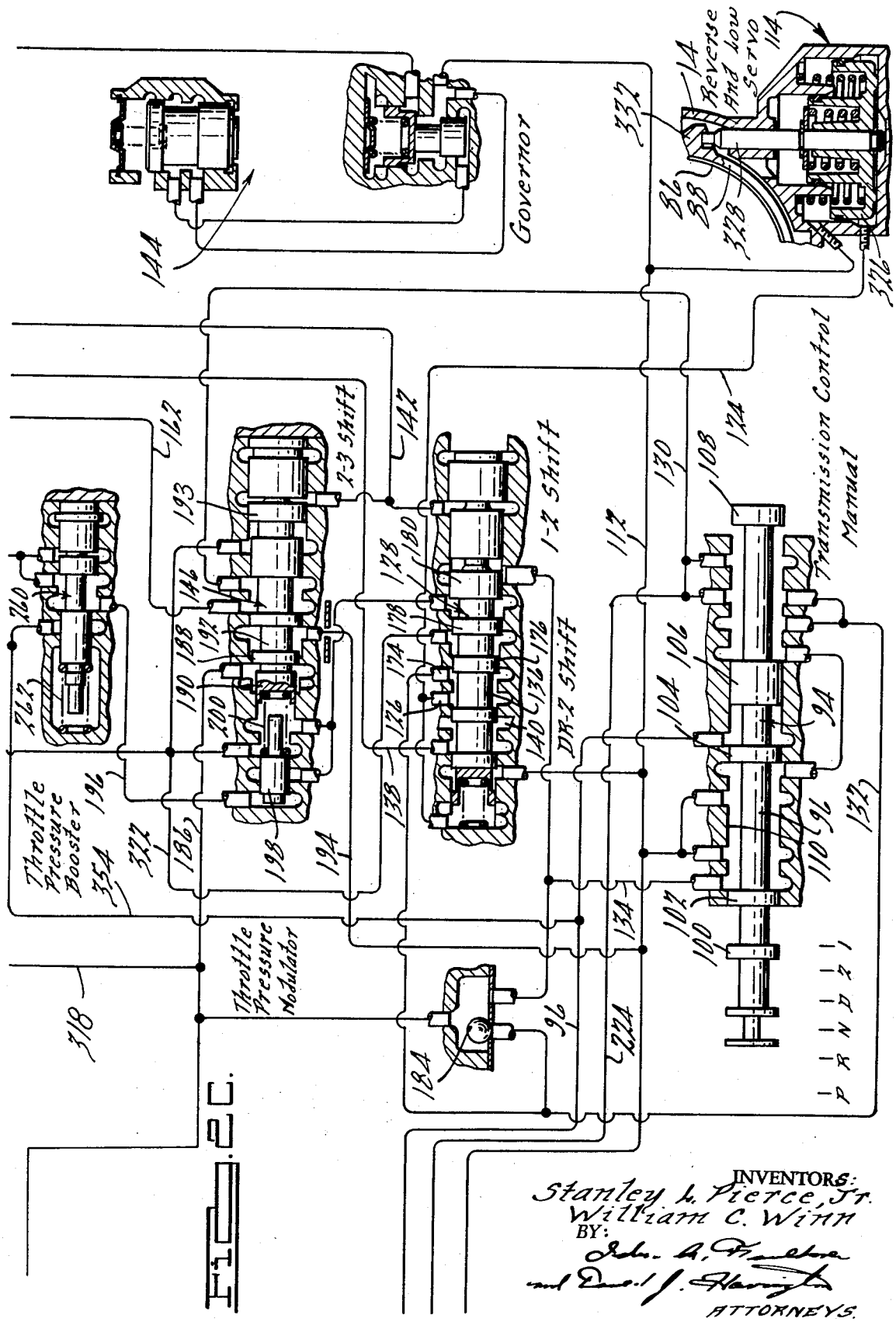

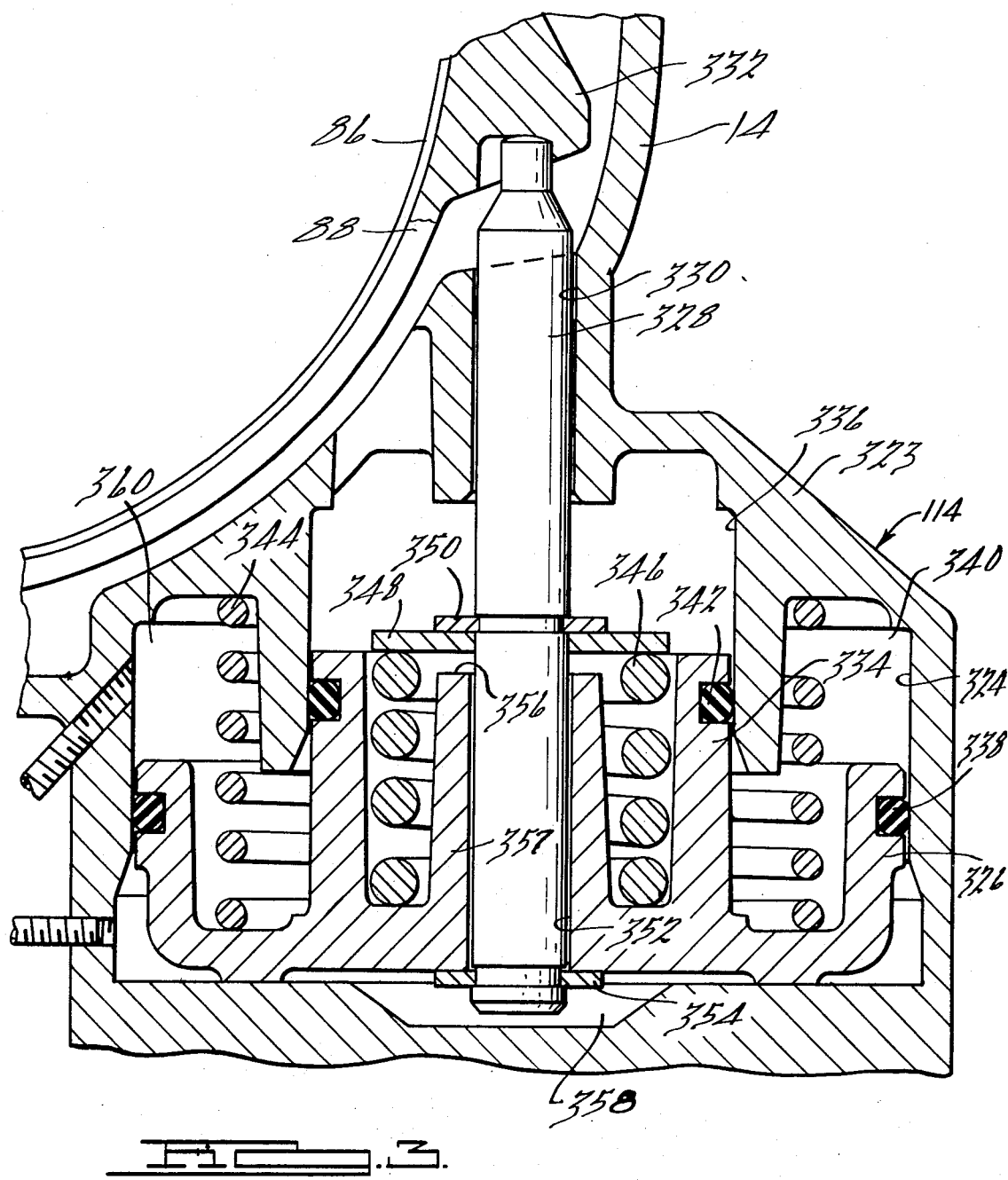

AUTOMATIC TRANSMISSION CONTROLS FOR AN AUTOMOTIVE VEHICLE DRIVELINE

GENERAL DESCRIPTION OF THE INVENTION

Our invention relates to improvements in an automatic control valve circuit for an automatic power transmission mechanism. It includes features that are common to the control valve circuit shown in U.S. Pat. Nos. 3,446,098, 3,327,554 and 3,295,387. The transmission mechanism with which our improved control system is used comprises a planetary gear system capable of establishing two underdrive speed ratios, a direct drive ratio and a reverse ratio. The torque input shaft for the transmission is connected to the turbine of the hydrokinetic torque converter, the impeller of which is connected to the vehicle engine. The relative motion of the individual gear elements of the planetary gear system is controlled by fluid pressure operated clutches and brakes. The clutches establish a "lock-up" condition for the gear system during operation in a high-speed, direct-drive ratio.

A first reaction brake anchors the reaction gear element of the gear system during operation in the second underdrive speed ratio. This brake is actuated by a fluid pressure operated brake servo having a cylinder and a brake piston which cooperate to define a pair of opposed fluid pressure chambers. When one chamber is pressurized, the servo piston is stroked to a brake applying position. When both chambers are pressurized the piston is stroked to a brake release position.

During a ratio change from an intermediate speed ratio to a high speed ratio, the high speed ratio clutch is applied simultaneously with the release of the intermediate speed ratio brake. This is accomplished by hydraulically connecting the servo for the high speed ratio clutch to the release side of the intermediate brake servo.

It is possible to accomplish a downshift from the high speed ratio to the intermediate ratio by exhausting the common passage that extends to the high speed clutch and the release side of the intermediate brake servo. Pressure distribution to and from the high speed clutch and the release side of the intermediate servo during upshifts to the high speed ratio and downshifts to the intermediate speed ratio is controlled by a 2-3 shift valve located in the circuitry between the transmission pump and the common feed passage. The connection between the pump and the 2-3 shift valve is controlled by a driver operated manual valve. The 2-3 shift valve is actuated automatically in response to changes in two opposed fluid pressure signals, one of which is proportional in magnitude to the driven speed of the transmission output shaft and the other of which is proportional in magnitude to the engine intake manifold pressure, which is an indicator of engine torque. Corresponding ratio changes between the lowest ratio and the intermediate, second speed ratio are controlled by a 1-2 shift valve. Control pressure from the pump is distributed to each of the shift valves through a manual valve that is under the control of the vehicle operator. Control pressure is supplied to the 2-3 shift valve through the 1-2 shift valve so that pressure is made available to the 2-3 shift valve for pressure distribution to the high speed ratio clutch only when the 1-2 shift valve is in the upshift position.

If the manual valve is shifted to a second speed ratio, underdrive position, the line pressure passage extending from the manual valve through the 1-2 shift valve to the 2-3 valve becomes exhausted. Simultaneously, pressure is distributed by the manual valve through the 1-2 shift valve thereby forcing the 1-2 shift valve to assume the intermediate speed ratio position. As the high clutch is exhausted through the exhaust flow path made available by the manual valve, the intermediate speed ratio servo strokes to the brake release position. This requires displacement of fluid from the release side of the brake servo. The rate of application of the intermediate servo can be controlled by controlling the rate of release of fluid from the release side of the servo piston.

If the downshift from the high speed ratio to the intermediate speed ratio should occur when the engine throttle is relaxed, the brake application should be cushioned to avoid inertia forces incident to the high deceleration of the braked elements. This cushioning action is accomplished by controlling the rate of release of fluid from the release side of the intermediate brake servo by means of a flow control valve that is influenced by the output shaft speed pressure signal. The cushioning action is accomplished as the 3-2 coast control valve blocks the fluid flow path extending from the release side of the intermediate servo and forcing the fluid to pass through a flow restricting orifice at speeds less than a predetermined value; for example, 20 m.p.h.

If the transmission is operating at a relatively high speed and a downshift to the intermediate ratio is forced by the vehicle operator as he demands more driving torque, a delay in the application of the intermediate brake servo following release of the high speed clutch is desirable to allow the engine sufficient time to accelerate to the speed that accompanies intermediate speed ratio operation. This 3-2 downshift will also require a cushioned engagement. This is accomplished by a 3-2 shift timing valve that is sensitive to the driven speed of the transmission mechanism. The 3-2 shift timing valve functions to introduce an orifice into the fluid flow path extending from the release side of the intermediate servo at any speed in excess of a predetermined value, such as 50 m.p.h. The orifice in the flow path is bypassed, however, when the downshift occurs at lower speeds.

With this arrangement, it is possible to calibrate the downshift timing requirements during a 3-2 downshift under zero torque or reduced throttle conditions without reference to the downshift timing requirements for a 3-2 downshift under torque at high speeds. The valve system can be calibrated to satisfy each of the differing timing requirements as downshifts occur under these differing driving conditions.

Our improved valve circuit is characterized also by a coasting line pressure boost valve means which cooperates with the main fluid pressure regulator to provide an augmentation in the circuit pressure when the vehicle is coasting with a relaxed throttle at high speeds. In the intermediate speed ratio, this augmentation provides friction braking torque capacity for the low speed ratio brake and the forward drive clutch. Provision is made, however, for limiting the magnitude of the pressure augmentation so that the circuit pressure under such coasting conditions will not increase to a value that will contribute to harshness in the brake engagement as a downshift occurs from the high speed ratio to the low speed ratio upon movement of the manual valve to the intermediate, second speed ratio position.

BRIEF DESCRIPTION OF THE FIGURES OF THE DRAWING

FIG. 1A shows a cross sectional view of a hydrokinetic torque converter and converter housing for a transmission mechanism used with the control circuit of my invention.

FIG. 1B is a continuation of FIG. 1A. It shows a planetary gear system for the transmission used with a control system of my invention.

FIGS. 2A, 2B and 2C each show separate portions of the control valve system of my invention.

FIG. 3 is an enlarged subassembly view of the low- and-reverse servo which is illustrated in the circuit diagram of FIG. 2C.

PARTICULAR DESCRIPTION OF THE INVENTION

Numeral 10 designates one end of an engine crankshaft. Numeral 12 designates a power output tailshaft which is adapted to be connected to the vehicle traction wheels through a driveline and a differential and axle assembly.

The transmission structure shown in FIGS. 1A and 1B has several features that are common to the structure shown in FIG. 1 of U.S. Pat. No. 3,295,387. For this reason, the particular description of the structure of FIGS. 1A and 1B will not be as inclusive as the corresponding description in U.S. Pat. No. 3,295,387.

Main transmission housing 14 encloses simple planetary gear units indicated at 16 and 18. Converter housing 20 is bolted at its left hand margin to the cylinder block of the internal combustion engine. It is connected at its right hand end to the left hand end of housing 14. Tailshaft extension housing 22 surrounds output shaft 12 and is bolted at its left hand end to the right hand end of housing 14. Housing portion 20 encloses a hydrokinetic torque converter 24. The converter includes a bladed impeller 26, a bladed turbine 28 and a bladed stator 30. The impeller, the turbine and the stator are arranged in fluid flow relationship in a common torus circuit. The impeller includes a shell, which is connected drivably to drive plate 32. This in turn is bolted to the end of crankshaft 10.

The shell of the impeller has secured thereto radially extending blades 34 which act as a centrifugal pump for the ambient air in cavity 36 of housing 20. Cavity 36 receives air through a suitable air intake duct extending to the atmosphere. Upon rotation of the impeller, blades 34 create a radial outflow of cooling air across the surface of the impeller. This air then is discharged through a suitable opening in the housing 20. A flow directing baffle 38 separates the intake air flow from the outlet flow.

Turbine 28 includes a driven turbine hub 40 which is splined at 42 to turbine shaft 44.

Impeller 26 is connected to impeller hub 46, which is journalled for rotation in internal wall 48 forming a part of housing portion 20. The pump housing 50 is bolted to wall 48 and encloses gear elements of a positive displacement pump 52, which serves as a pressure source for the control valve system to be described with reference to FIGS. 2A, 2B and 2C. A stator sleeve shaft 54 extends from the housing 50 and supports the inner race 56 of an overrunning brake 58 for stator 30.

A clutch hub 60 journals rotatably clutch-and-brake drum 62.

Clutch member 64 is splined at 66 to shaft 44. High- and-reverse clutch 68 is adapted to establish selectively a driving connection between the member 64 and driveshell 70. Driveshell 70 is splined to sun gear 72, which is common to both of the planetary gear units 16 and 18. Selectively engageable friction brake band 74 surrounds the drum 62 and may be applied to anchor the sun gear 72 during intermediate speed ratio operation. Forward drive clutch 76 is applied during operation in each of the forward driving speed ratios. It establishes a connection between clutch member 64 and the ring gear 78 of the planetary gear unit 16.

Carrier 80 of the gear unit 16 and ring gear 82 of the gear unit 18 are connected directly to power output shaft 12. Carrier 84 of planetary gear unit 18 is connected to brake drum 86 about which is positioned low- and-reverse brake band 88. This brake band is applied during operation in reverse and during coast braking operation in the low speed ratio so that carrier 84 may act as a reaction point. Overrunning brake 90 provides one-way braking action for the brake drum 86 so that the reaction torque can be distributed from the brake band 86 to the inner brake race 92, which is connected to transmission housing 14.

Low speed forward drive operation is obtained by engaging the forward drive clutch 76. Torque then is delivered from the turbine shaft 44 to the ring gear 78, thus imparting a driving torque to the carrier 80 and the power output shaft 12. The reaction torque on the sun gear 72 is in a reverse direction. This causes a forward driving torque on the ring gear 82, which is transferred to the output shaft 12 as carrier 84 acts as a reaction member. Carrier 84 is anchored in this instance by the overrunning brake 90.

Second speed ratio operation is achieved by engaging brake 74. This anchors the sun gear 72. The ring 78 continues to act as a power input element and carrier 80 continues to drive the output shaft 12. Overrunning brake 90 freewheels so that all of the torque multiplication is accomplished by gear unit 16. Gear unit 18 becomes inactive.

Third speed ratio, direct-drive operation is achieved be releasing brake 74 and applying clutch 68 as clutch 76 remains applied.

Reverse drive is achieved by releasing the clutch 76 and applying the clutch 68 while engaging the brake band 88. Turbine torque then is delivered from the shaft 44 directly to the sun gear 72. With the carrier 84 acting as a reaction point, ring gear 18 and power output shaft 12 are driven in a reverse direction.

The control circuit of FIGS. 2A, 2B and 2C includes the positive displacement pump 52 described with reference to FIG. 1A. Pump 52 delivers control pressure to manual valve 94 through high pressure passage 96. Valve 94 includes a multiple land valve element 98 having spaced valve lands 100, 102, 104, 106 and 108. These valve lands register with internal valve lands formed in valve cavity 110. The manual valve element 98 can be adjusted to any one of several operating positions indicated by the reference symbols R, N, D, "2" and "1".

FIG. 2C shows the manual valve in the "N" position. The symbols correspond respectively to reverse drive, neutral, automatic forward drive range, second speed ratio underdrive range and first speed ratio underdrive range. When manual valve element 98 is in the "D" position, automatic ratio changes during forward drive operation are obtained automatically in response to changing engine manifold pressure and vehicle speed. When the manual valve element assumes the "2" position, the transmission mechanism is conditioned for continuous operation in the intermediate underdrive ratio. When the manual valve element assumes the "1" position, the transmission mechanism is conditioned for continuous underdrive operation in the lowest speed ratio.

When manual valve element 98 assumes the neutral position as shown in FIG. 2C, all of the passages communicating with the chamber 110, with the exception of passage 96, are exhausted. Passage 96 is blocked by valve lands 104 and 106.

When the manual valve element is shifted to the D position, pressure is distributed through the manual valve 94 to passage 112 which extends to a pressure chamber of relatively reduced volume formed on one side of a compound piston for low-and-reverse servo 114. Pressure on the opposite side of the piston tends to move the piston against the opposing force of a servo spring 344 to effect braking engagement of brake band 88.

The opposite side of the piston partly defines a relatively large fluid pressure chamber, which is in fluid communication with passage 124. This passage extends to port 126 of 1-2 shift valve assembly 128, the operation of which will be described subsequently.

Passage 112 is pressurized also when manual valve element 98 assumes the "2" position and the "1" position.

The manual valve element chamber 110 communicates through either axial end thereof with the exhaust region.

Passage 130, which also communicates with the valve chamber 110, is pressurized whenever manual valve element 98 assumes the "R" position. It is exhausted at other times through the right hand end of the valve chamber 110. Passage 132 also communicates with the valve chamber 110 and is pressurized whenever the manual valve assumes the "1" position or the reverse position "R."

Passage 134, which communicates with the valve chamber 110, is pressurized whenever the manual valve element 98 assumes the "2" position. It is exhausted at other times.

Passage 112 which is pressurized whenever the manual valve assumes the forward drive position, communicates directly with the forward drive clutch 76.

Ratio changes between the low speed ratio and the intermediate speed ratio are controlled by 1-2 shift valve assembly 128. This includes valve spool 136, which exhausts passage 138 through exhaust port 140 when it assumes the position shown. Governor pressure in passage 142 acts upon the right hand end of the valve spool 136 thereby tending normally to urge it in a left hand direction. When it assumes a left hand position, spool 136 will cause distribution of pressure from passage 112 to passage 138, and passage 124 at the same time is exhausted through port 140.

Governor pressure in passage 142 is developed by a compound governor valve assembly 144 which is connected drivably to tailshaft 12, as indicated in FIG. 1B. The same governor pressure signal in passage 142 acts upon the right hand end of 2-3 shift assembly 146, which will be described subsequently.

When passage 138 is connected to passage 112 through the 1-2 shift valve assembly, pressure is distributed through the 2-3 backout valve assembly 148 to the apply side of intermediate servo 150. This servo includes piston 152 having a pressure chamber on either side thereof. The pressure chamber corresponding to the apply side of the servo is identified by reference character 154. It is connected to passage 138 and the 2-3 backout valve 148 through passage 156. A release pressure chamber 158 is formed on the opposite side of piston 152, and this communicates through passage 160 with passage 162. A one-way check valve 164 is located in the passage 160 to permit distribution of pressurized fluid from passage 162 to the passage 160 but preventing fluid pressure distribution in the opposite direction.

When both pressure chambers 158 and 154 are pressurized, the piston 152 is stroked to the brake release position since chamber 158 has a larger effective pressure area. When distribution of pressure to chamber 158 is interrupted, the piston will stroke to the brake apply position under the influence of pressure in chamber 154. This requires displacement of the fluid that exists in chamber 158. This displaced fluid is transferred through accumulator valve 166. This valve includes a single diameter valve element 168 which is biased under the influence of valve spring 170 to the position shown in FIG. 2B. When it assumes that position, communication between passage 160 and valve port 172 is interrupted. Valve port 172 communicates directly with the passage 162. Passage 160 and port 172 are located at spaced locations in the valve chamber within which valve element 168 is situated.

The presence of the accumulator valve 166 in the exhaust flow circuit for the release side of the intermediate servo thus provides an accumulator effect which modifies the rate of brake application.

When the 1-2 shift assembly 128 is shifted in a left hand direction during an upshift from the low speed ratio to the intermediate speed ratio, exhaust port 140 is brought into communication with passage 124 which extends to the larger low-and-reverse servo pressure chamber. If the low-and-reverse servo brake 88 is applied immediately prior to a ratio change to the intermediate speed ratio position, it now becomes released.

If the manual valve should be shifted to either the low or reverse positions, passage 132 becomes pressurized. This passage communicates directly with port 174. When the 1-2 shift valve element 136 is in the position shown, communication is established through the 1-2 shift valve chamber with the port 126 and the passage 124. Passage 124 communicates also with the spring chamber located on the left side of the valve element 136 so that when the manual valve element is in the L or R position, the 1-2 shift valve assembly is locked in its low speed or right hand position. An upshift from the low speed ratio to the intermediate speed ratio than cannot be effected regardless of the changing governor pressure. If the manual valve should be shifted to the low speed ratio position when the transmission is operating at a relatively high speed, the governor pressure will be sufficient to overcome the opposing influence of control pressure in passage 132 acting on the differential area of lands 176 and 178. The left hand side of the valve element 136 will be exhausted through port 140 under these conditions. As soon as the vehicle speed is reduced to a coasting downshift point that is predetermined, the valve element 136 will shift in a right hand direction and pressure then will be distributed to the left hand side of the valve element 136, as explained previously, thereby locking the 1–2 shift valve assembly in its low speed ratio position.

If the manual valve should be shifted to the "2" position, pressure is made available to passage 134 as explained previously. This pressure is distributed to the right hand end of valve land 180 on the valve spool 136 thereby shifting the valve spool 136 in a left hand or upshift position. It is held in that position irrespective of changes in governor pressure in passage 142. Pressure is distributed also from passage 134 through the two-way check valve 184 to passage 186, which extends to a differential area defined by valve lands 188 and 190 on the valve spool 192 for the 2–3 shift valve assembly 146. Governor pressure is distributed to the right hand side of land 193 through passage 142.

When the valve spool 192 is in the position shown in FIG. 2C, communication between passage 162 and passage 194 is interrupted. Passage 194 communicates directly with the control pressure passage 112.

A throttle pressure signal, which is an indicator of engine torque, is distributed through passage 196 to one side of throttle pressure modulator valve 198. A valve spring 200 is located between the valve 198 and the spool 192 so that the pressure in passage 196 is modified. This modified pressure is distributed to the left hand side of the land 190 and to the differential area defined by lands 178 and 180 on the 1–2 shift valve assembly.

When the 2–3 shift valve assembly 146 moves to the upshift position, communication is established between passage 194 and the passage 162 extending to the high speed ratio clutch. Whenever the 2–3 shift valve assembly 146 is forced to assume the position shown in FIG. 2C, upshifts to the high speed ratio are prevented.

The effective control pressure made available to the circuit through passage 96 is regulated by pressure regulator valve 202. This includes passage 204 extending to the discharge side of pump 52 and an outlet bypass flow passage 205 extending to the relatively low pressure lubrication circuit and the feed passage for the hydrokinetic torque converter 24.

Regulator valve 202 includes a valve spool having a land 206 which communicates at its right hand side with passage 96. A valve spring 208 opposes the force of the pressure on land 206. Bypass flow passage 210 communicates with the pressure regulator valve 202 and conducts bypass fluid back to the inlet side of the pump 52.

The degree of communication between passage 204 and passage 206 is regulated by valve land 212 so that control pressure is maintained on the torque converter circuit.

Pressure booster valve 214 is located at the base of the regulator valve assembly 202. It includes a multiple land spool 216 having spaced lands 218, 220 and 222. The differential area defined by lands 220 and 222 is in fluid communication with passage 224, which communicates with the reverse pressure passage 130. This passage extends through the 2–3 shift valve assembly and it communicates with passage 162 when the 2–3 shift valve assembly is in the position shown in FIG. 2C. Thus the clutch 68 is engaged during reverse drive operation. At the same time, passage 132, which is pressurized when the manual valve assumes the low or reverse positions, communicates with passage 124 through the 1–2 shift valve assembly when the latter assumes the position shown in FIG. 2C. This engages the low-and-reverse servo.

Since the reaction torque during reverse drive is higher than it is during operation in the forward drive range, it is necessary to augment the circuit pressure to enable the clutch and the brake to satisfy the torque transmitting requirements. This pressure boost is achieved by the oil pressure boost valve assembly 214. The pressure in passage 224 acts upon the spool 216 and supplements the force of the spring 208 thereby causing higher circuit pressure to be regulated by the main oil pressure regulator valve 204. The magnitude of the circuit pressure is sensitive also to changes in a pressure signal in passage 225 which is determined by the magnitude of the intake manifold pressure of the vehicle engine. This pressure signal acts on the differential area of lands 218 and 220. The signal in passage 225 is distributed to it through the cutback valve 226 which establishes selectively a connection between 225 and passage 258 extending to primary throttle valve assembly 230. The same pressure signal from the throttle valve assembly 230 is distributed also through three-way check valve 233 to passage 234, which extends to the left hand side of the land 218 on the oil pressure booster.

The cutback valve includes multiple lands located on valve spool 236. When the valve spool 236 is positioned as shown, communication is established between passages 258 and 225 through the cutback valve. The pressure signal in passage 258 acts on the differential area of lands 238 and 240 to normally urge the valve spool to the position shown in FIG. 2A. This force is opposed by governor pressure acting on the upper end of land 238. Governor pressure is distributed to the cutback valve through governor pressure passage 242 which communicates with the governor valve assembly 144. After the vehicle reaches a predetermined speed during acceleration from a standing start, the cutback valve spool 236 is moved downwardly thereby exhausting the pressure in passage 225 through exhaust port 244. This reduces the net pressure force acting on the pressure regulator valve thereby causing a cutback in the regulated line pressure.

A throttle pressure signal that is in proportional magnitude to engine manifold pressure is developed by throttle valve assembly 230, which includes a spool valve element 246. This is connected mechanically to the flexible diaphragm 248 which defines in part a pressure cavity 250 connected to the engine manifold. Diaphragm 248 is urged normally in a left hand direction by valve spring 252.

Valve element 246 is located in a valve chamber which is in direct communication with the control pressure passage 96 through passage 354 and passage 256. Valve element 246 modulates the pressure in passage 256 to produce a reduced pressure in passage 258, which is proportional to the magnitude of the pressure in the chamber 250.

The pressure signal in passage 258 is distributed directly to throttle pressure booster 260 which communicates with passage 354. Valve spring 262 normally maintains the valve 260 in the position shown in FIG. 2C thereby establishing a direct connection between passage 258 and passage 196. When the engine intake manifold pressure is at an intermediate value, valve 260 is moved in a left hand direction thereby establishing controlled communication between line pressure passage 354 and passage 196 as communication is restricted between passage 196 and passage 258.

The modified throttle pressure signal in passage 196 in turn is distributed to the throttle pressure modulator valve element 198, the output from which is distributed to both the 2–3 shift valve and the 1–2 shift valve as explained previously. The shift point then can be established by appropriately calibrating valve 148 without interfering with the pressure signal delivered from valve assembly 230 directly to the oil pressure booster 214.

Augmentation of the circuit pressure during coasting operation in the second speed ratio can be achieved by the "2" range coasting boost valve assembly 264. This comprises a valve spool having differential valve lands 266 and 268. Control pressure from passage 186 is distributed to the differential area of the valve assembly 264. Passage 186 communicates with passage 132 through the three-way check valve 184. It communicates also with the passage 134 through the same valve when the manual valve is shifted to the "2" position. Thus, control pressure is made available to passage 186 when the manual value is in the low and reverse range positions as well as the second speed ratio position. Governor pressure acts on the left hand side of the valve assembly 264 and is distributed to it through governor pressure passage 270 which communicates directly with previously described governor pressure passage 142.

When the vehicle is coasting at high speeds, the engine braking torque is relatively high and the throttle pressure, since coasting occurs with a relaxed throttle, tends to become reduced. In order to permit the clutch and brake torque transmitting capacity to remain high enough to accommodate the coasting torque braking, the governor pressure acting on the valve assembly 264 will cause the valve assembly 264 to modulate the pressure in passage 270 to produce an augmented pressure in passage 272, which is distributed through the three-way check valve 233 to passage 234 thereby resulting in an augmentation in the net pressure forces acting on the oil pressure booster. The magnitude of the coasting boost effect will decrease as the vehicle coasting speed decreases.

As explained previously, high speed ratio operation is achieved as the high clutch 68 becomes applied. The feed passage 162 for the high clutch 68 acts also as a feed passage for the release side of the intermediate servo. Passages 160 and 162 are connected, as explained previously, by the one-way check valve 164 during an upshift from the intermediate ratio to the high speed ratio. The same passages are connected on a downshift through the accumulator valve 166.

To effect a downshift from the high speed ratio to the intermediate speed ratio, it is necessary for the high clutch 68 to become released as the intermediate servo becomes applied. It is necessary, therefore, for the release side of the intermediate servo and the high speed clutch to be exhausted through passage 162 and through the 2–3 shift valve assembly 146. The latter establishes communication between passage 162 and passage 130, which communicates with the exhaust region during forward drive operation. It is desirable, when such a shift occurs under zero torque conditions, for the intermediate servo to become released with a cushioning action because the reaction torque acting on the intermediate brake is slight at that time. This cushioning action is achieved by the 2–3 backout valve 148. Normally the 2–3 backout valve 148 is urged to the position shown in FIG. 2B by throttle pressure in passage 258 and by the action of the valve spring 274. Therefore, during a 3–2 downshift at zero throttle, the valve 148 will be shifted in a right hand direction thereby establishing communication between the apply side of the intermediate servo and the high clutch 68. The intermediate servo then acts as an accumulator for the high clutch thereby delaying the disengagement of the high clutch and cushioning the application of the intermediate brake. After the shift is accomplished, the pressure acting on the left hand side of the valve 148 will have decayed sufficiently to permit this valve spring 274 to urge the valve 148 into the position shown in FIG. 2B.

When a 3–2 coasting downshift occurs at speeds less than 20 m.p.h., the rate of application of the intermediate speed ratio brake is controlled by the 3–2 coast control valve 276. When a torque demand downshift occurs from the high speed ratio to the intermediate speed ratio in response to an engine torque demand by the vehicle operator at speeds greater than 50 m.p.h., the downshift is controlled by 3–2 shift timing valve 278. Under both downshift conditions, however, the rate of application of the servo is controlled by a control orifice indicated by reference numeral 280 which is situated in the fluid flow path for the fluid displaced from the release side of the intermediate servo through passage 160.

The 3–2 coast control valve 276 comprises a multiple land valve spool 282 having spaced valve lands 284, 286 and 288. Spool 282 is urged normally in a downward direction, as viewed in FIG. 2B, by valve spring 290. Valve chamber 292, which receives the spool 282, registers with the valve lands on the spool 282 thereby establishing controlled communication between the release side of the intermediate servo and passage 162. Port 294 in the chamber 292 communicates with the upstream side of the orifice 280 and port 296 communicates with the downstream side of the orifice 280.

Valve element 282 is subjected to governor pressure which is distributed to the lower end of the land 284 through passage 270. When the vehicle operates at a relatively low speed, such as speeds less than 20 m.p.h., the pressure in passage 270 is insufficient to overcome the force of the spring 290 and the valve element 282 assumes the position as shown in FIG. 2B. At that time, port 294 becomes blocked by land 288 and port 296 is opened so that it communicates with passage 162. During a coasting 3-2 downshift at low speeds it therefore is necessary for the fluid on the release side of the intermediate servo to be displaced through the orifice 280 as it flows through the passage 162 and through the 2-3 shift valve 146 to the exhausted passage 130. This delays the application of the intermediate servo following release of the high speed ratio clutch 68. The orifice 280 does not delay the release of the high clutch 68. The rotary elements that are connected to the torque output side of the clutch 68 then have time to decelerate before the application of the brake, thus reducing the inertia force experienced as the brake becomes applied. When the vehicle is operated at speeds greater than the predetermined threshold value, which may be 20 m.p.h. as mentioned earlier, the valve element 282 is moved upwardly against the force of spring 290 thereby blocking communication between port 296 and passage 162 and opening port 294 so that it communicates with passage 298 extending to the 3-2 shift timing valve.

Valve 278 comprises a valve spool having spaced valve lands 300 and 302. It is urged in a downward direction as indicated in FIG. 2B by valve spring 304. When it assumes the position shown in FIG. 2B, communication is established through valve chamber 306 between passage 298 and passage 308, the latter communicating with passage 162 through three-way check valve 310. When a downshift occurs under these conditions, the fluid displaced from the release side of the intermediate servo is transferred directly through the 3-2 coast control valve 276 without passing through the orifice 280. The fluid then passes directly from passage 298 to passage 162 without further flow restriction. Such a downshift occurs during normal automatic speed ratio changes while the vehicle is operating under torque. These ratio changes occur in response to shifting movement of the 2-3 shift valve as explained previously. The brake application delay that is desirable during a 3-2 coasting downshift is not desirable during downshifts under torque because a controlled degree of overlap in the clutch release and the brake application is desired in this instance.

If a forced downshift from the high speed ratio to the low speed ratio occurs at a relatively high speed (for example, at vehicle speeds greater than 50 m.p.h.), it is desirable to introduce a controlled delay in the application of the intermediate servo in order to allow the engine sufficient time to accelerate from its given speed to the higher speed necessary for operation in the intermediate ratio. This shift timing is achieved by the 3-2 shift timing valve 278 at vehicle speeds greater than 50 m.p.h., the governor pressure is sufficient to create a force on the lower end of the land 300 to move the valve 278 against the force of spring 304 thereby blocking passage 298 and interrupting the exhaust flow path to the passage 308. Under these conditions, the orifice 280 provides the only fluid flow path for the oil displaced from the release side of the intermediate servo.

If the vehicle is operated at a speed less than the predetermined value of 50 m.p.h., the valve 278 will assume the position shown in FIG. 2B thereby directly connecting passage 298 and passage 308 permitting the fluid displaced from the release side of the intermediate servo to bypass the orifice 280. This permits a more rapid application of the intermediate brake band. The shift timing requirements for such 3-2 downshifts under torque at high speeds can be achieved by appropriately calibrating the valve 278 without reference to the 3-2 downshift timing requirements during a downshift at relaxed throttle at low speeds. The latter downshift as mentioned earlier is controlled by independently calibrating the 3-2 coast control valve 276. The accumulator 166 is introduced into the fluid flow path for the oil on the release side of the intermediate servo during each type of downshift. The accumulator is calibrated to produce a desired back pressure compatible with the downshift timing requirements during ratio changes from the high speed ratio to the intermediate speed ratio under each of the driving conditions.

A forced downshift valve, which will overrule the automatic operation of the shift valves, is identified generally by reference character 314. Fluid pressure from the pump 52 is supplied to passage 316 from passage 256. Passage 316 extends to the inlet side of the valve 314. Valve 314 is controlled by the engine carburetor throttle linkage. When it is moved to a downshift position, valve 314 will establish a connection between passage 316 and passage 318, which extends to the kickdown pressure passage 186 for the 2-3 shift valve. It distributes pressure also to passage 320 which extends to passage 322 which communicates with the left hand end of the 2-3 shift valve assembly, the differential area provided by land 193 on the 2-3 shift valve spool, and to the differential area on the 1-2 shift valve spool defined by lands 176 and 178. Thus a forced downshift can be achieved from the high speed ratio to the low speed ratio only when the vehicle speed is sufficiently low to permit the shift to occur.

In FIG. 3, we have shown the low-and-reverse brake servo. It comprises a cylinder housing 323 which forms a part of the transmission housing 14. Housing 323 defines a cylinder 324 within which is positioned piston 326. Piston rod 328 extends through opening 330 in the housing 323. Its outer end engages one end 332 of the brake band 88. When the piston rod 328 is advanced, the brake band 88 frictionally engages the brake drum 86.

Piston 326 is a double acting piston. It includes a central circular sleeve portion 334 which is received within cylindrical portion 336 of the housing 322. The main portion of the piston 326 registers slidably with the cylinder 324. A suitable circular seal 338 surrounds the main portion of the piston 326 to provide a fluid seal for pressure chamber 340, which is defined by the cooperating main portion of the piston 326 and the cylinder 324. The second annular seal 342 surrounds the sleeve 334 and registers with the cylindrical surface 336.

Spring 344 is interposed between the piston 326 and the housing 322 tending normally to urge the piston rod 328 to a retracted position. A second piston spring 346 is situated between the piston 326 and a spring seat 348, which is held axially fast on the piston rod 328 by snap ring 350.

The piston rod 328 extends through central opening 352 in the piston 326. Movement of the piston rod 328 beyond a limiting position is prevented by anchor ring 354. A limited amount of axial movement of the piston 326 with respect to the piston rod 328 can be accommodated because of the spacing that normally exists between the spring seat 348 and the end 356 of the central hub 357 for the piston 326. Spring 346 normally resists relative axial displacement of the piston 326 with respect to the piston rod 328. The spring 346 is compressed upon axial movement of the piston 326 with respect to the piston rod 328 thereby providing a so-called accumulator effect when the brake is stroked to an applied position under the influence of servo pressure in cavity 358, the latter being defined by the piston 326 and cooperating cylinder 324.

A second pressure chamber 360 is defined by the radially outward portion of the piston 326 and the housing 322. Fluid pressure admitted to chamber 360 will produce a force on the piston 326 that will oppose the force of the pressure in chamber 358. Since the effective pressure area for the chamber 358 is greater than the effective pressure area for the chamber 360, the net force acting on the piston 326 when both chambers are pressurized will tend to engage the brake.

As previously explained with reference to the circuit diagram of FIG. 2A, 2B and 2C, both passages 112 and and 124 are pressurized when the transmission servo is stroked to the applied position during low speed ratio operation. Thus, the engaging force for the servo is equal to the difference between the force developed by the pressure in chamber 358 and the force developed by the pressure in chamber 360. This net force is sufficient to maintain the brake engaged during operation of the transmission in manual low.

A higher engaging force is required during reverse operation as explained previously. This is accomplished by pressurizing passage 124 while exhausting passage 112. In these circumstances, chamber 358 becomes pressurized and chamber 360 becomes exhausted. The double acting piston and cylinder arrangement thus is effective as a dual capacity brake servo.

Having thus described a preferred form of our invention, what we claim and desire to secure by U.S. Letters Patent is:

1. An automatic power transmission mechanism for use in an automotive vehicle driveline for delivering torque from a power input member to a power output member, multiple ratio torque transmitting gearing establishing torque delivery paths between said input member and said output member, fluid pressure operated clutch means for connecting together for rotation in unison two elements of said gearing during high speed ratio operation, friction brake means for anchoring one element of said gearing to establish a torque reaction point during operation of said gearing in an underdrive ratio, a fluid pressure source, said brake means including a double acting servo having a cylinder and a piston movable in said cylinder and cooperating therewith to define opposed fluid pressure chambers, one of which has a larger effective fluid pressure working area than the other, said brake means being applied when said other pressure chamber is pressurized and said one pressure chamber is exhausted, said brake means being released when said one pressure chamber is pressurized, conduit structure connecting said pressure source with said clutch means and with said brake means including a common conduit portion extending between said one chamber and said clutch means, valve means in said conduit structure for controlling pressure distribution to said one and said other pressure chambers to effect application and release of said brake means thereby accomplishing ratio changes between said high speed ratio and said underdrive ratio, a flow restricting means situated in the conduit structure portion extending to said one chamber, a source of a pressure signal that is proportional in magnitude to the driven speed of said output member, first timing valve means communicating with said speed signal source and responsive thereto for establishing a fluid flow path around said flow restricting means from said one chamber when said driven speed is greater than a first limiting value and second timing valve means communicating with said signal source and responsive thereto for establishing a fluid flow path around said flow restricting means from said one chamber when said driven speed is less than a second predetermined limiting value, the rate of displacement of fluid from said one chamber, upon application of said brake means during a ratio change to said underdrive ratio, being retarded when said flow paths around said flow restricting means are interrupted by said timing valve means at speeds greater than said second limiting value and at speeds less than said first limiting value.

2. The combination set forth in claim 1 wherein said first timing valve means responds to said speed pressure signal to open its associated flow path at a lower speed than the speed at which said second timing valve means responds to its pressure signal to close the flow path associated therewith.

3. The combination set forth in claim 1 wherein the portion of the conduit structure communicating with said one chamber includes an accumulator valve element and a valve chamber defining a fluid flow path from said one chamber, spring means for biasing said accumulator valve element to a flow path closing position, and one-way check valve means in parallel relationship with respect to said accumulator valve means for accommodating fluid flow to said one chamber and blocking flow from said one chamber.

4. The combination set forth in claim 2 wherein the portion of the conduit structure communicating with said one chamber includes an accumulator valve element and a valve chamber defining a fluid flow path from said one chamber, spring means for biasing said accumulator valve element to a flow path closing position, and one-way check valve means in parallel relationship with respect to said accumulator valve means for accommodating fluid flow to said one chamber and blocking flow from said one chamber.

5. The combination set forth in claim 1 wherein said first timing valve means and said second timing valve means form separate fluid flow paths accommodating flow of fluid from said one chamber during a ratio change to an underdrive ratio, each path being in parallel disposition with respect to said flow restricting means, the latter being common to each timing valve means.

6. The combination set forth in claim 2 wherein said first timing valve means and said second timing valve means form separate fluid flow paths accommodating flow of fluid from said one chamber during a ratio change to an underdrive ratio, each path being in parallel disposition with respect to said flow restricting means, the latter being common to each timing valve means.

7. The combination set forth in claim 3 wherein said first timing valve means and said second timing valve means form separate fluid flow paths accommodating flow of fluid from said one chamber during a ratio change to an underdrive ratio, each path being in parallel disposition with respect to said flow restricting means, the latter being common to each timing valve means.

8. The combination set forth in claim 4 wherein said first timing valve means and said second timing valve means form separate fluid flow paths accommodating flow of fluid from said one chamber during a ratio change to an underdrive ratio, each path being in parallel disposition with respect to said flow restricting means, the latter being common to each timing valve means.

9. The combination set forth in claim 5 wherein the fluid flow path defined by said second timing valve means extends to said one chamber and communicates with said first timing valve means, the flow path defined by said first timing valve means having portions that are common to the flow path defined by said second timing valve means.

10. The combination set forth in claim 6 wherein the fluid flow path defined by said second timing valve means extends to said one chamber and communicates with said first timing valve means, the flow path defined by said first timing valve means having portions that are common to the flow path defined by said second timing valve means.

11. The combination set forth in claim 7 wherein the fluid flow path defined by said second timing valve means extends to said one chamber and communicates with said first timing valve means, the flow path defined by said first timing valve means having portions that are common to the flow path defined by said second timing valve means.

12. The combination set forth in claim 8 wherein the fluid flow path defined by said second timing valve means extends to said one chamber communicates with said first timing valve means, the flow path defined by said first timing valve means having portions that are common to the flow path defined by said second timing valve means.

13. A control system for a power transmission mechanism adapted to deliver driving torque from a power input member to a power output member including gearing having elements that establish plural torque delivery paths, clutch means for connecting together relatively movable elements of said gearing to establish common rotation during high speed ratio operation, first brake means for anchoring a first reaction element of said gearing to establish intermediate speed ratio operation, second brake means for anchoring a second reaction element of said gearing to condition said gearing for operation in a lower speed underdrive ratio and for reverse drive operation, fluid pressure operated servo means for applying and releasing said second brake means including a double acting piston and a cooperating servo cylinder receiving said piston, said piston cooperating with said servo cylinder to define opposed fluid pressure chambers, the effective working area of one chamber being less than the effective working area of the other chamber, said second brake means being applied simultaneously with said clutch means to establish reverse drive operation, a pressure source, conduit structure extending between said pressure source and said second brake means including separate portions communicating with each pressure chamber thereof, valve means for selectively controlling distribution of pressure to the two chambers of said second brake means, the other chamber of said second brake means being pressurized and the one chamber thereof being exhausted during reverse drive operation and both pressure chambers of said second brake means being pressurized during low speed ratio operation, said first brake means also including a double acting fluid pressure operated brake piston defining opposed fluid pressure areas, one of which is exhausted when said first brake means is applied, said conduit structure including portions extending to each working chamber of said first brake means, and timing valve means responsive to the driven speed of said output member for timing the rate of displacement of fluid from the other of said working areas of said first brake means when said first brake means is applied to establish intermediate speed ratio operation.

14. The combination set forth in claim 13 wherein the piston for said second brake means includes two radially spaced cylindrical parts, said second brake means including a compound servo cylinder having two cylindrical portions one spaced radially with respect to the other, one piston part slidably registering with one cylinder portion and the other piston part slidably registering with the other cylinder portion, said piston parts registering with their respective cylinder portions to define said working areas.

* * * * *